US009313661B2

(12) United States Patent
Eling et al.

(10) Patent No.: US 9,313,661 B2
(45) Date of Patent: Apr. 12, 2016

(54) METHOD OF ESTABLISHING COMMUNICATION BETWEEN DEVICES IN A VEHICLE

(71) Applicant: GM Global Technology Operations LLC, Detroit, MI (US)

(72) Inventors: Russ Eling, Lasalle (CA); Kenneth L. Peirce, Grosse Pointe Farms, MI (US); David P. Pop, Garden City, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 202 days.

(21) Appl. No.: 13/782,456

(22) Filed: Mar. 1, 2013

(65) Prior Publication Data

US 2013/0231052 A1 Sep. 5, 2013

Related U.S. Application Data

(60) Provisional application No. 61/605,736, filed on Mar. 1, 2012.

(51) Int. Cl.
*H04L 29/06* (2006.01)
*H04W 12/06* (2009.01)
*H04L 29/08* (2006.01)
*H04W 12/08* (2009.01)

(52) U.S. Cl.
CPC ........... *H04W 12/08* (2013.01); *H04L 63/0876* (2013.01); *H04L 67/12* (2013.01); *H04W 12/06* (2013.01)

(58) Field of Classification Search
CPC .. H04W 12/08; H04W 12/06; H04L 63/0876; H04L 67/12
See application file for complete search history.

(56) References Cited

U.S. PATENT DOCUMENTS

| 2003/0105964 | A1* | 6/2003 | Brainard et al. | 713/178 |
| 2004/0193683 | A1* | 9/2004 | Blumofe | 709/204 |
| 2005/0186941 | A1* | 8/2005 | Gault et al. | 455/411 |
| 2006/0079203 | A1* | 4/2006 | Nicolini | 455/411 |
| 2006/0287965 | A1* | 12/2006 | Bajan | 705/75 |
| 2008/0262846 | A1* | 10/2008 | Burns et al. | 704/260 |
| 2008/0263363 | A1* | 10/2008 | Jueneman et al. | 713/184 |
| 2010/0097178 | A1 | 4/2010 | Pisz et al. | |
| 2010/0268611 | A1* | 10/2010 | Reid et al. | 705/16 |
| 2011/0071720 | A1* | 3/2011 | Schondorf et al. | 701/30 |
| 2011/0117845 | A1* | 5/2011 | Kirsch et al. | 455/41.2 |
| 2011/0258121 | A1* | 10/2011 | Kauniskangas et al. | 705/67 |
| 2011/0273279 | A1* | 11/2011 | Vandivier et al. | 340/10.4 |
| 2011/0301839 | A1 | 12/2011 | Pudar et al. | |
| 2012/0095642 | A1* | 4/2012 | Nishida | 701/31.4 |
| 2012/0115446 | A1* | 5/2012 | Gautama et al. | 455/414.1 |

* cited by examiner

Primary Examiner — Lewis West
(74) Attorney, Agent, or Firm — Christopher DeVries; Reising Ethington P.C.

(57) ABSTRACT

A method and system for establishing secure short range wireless communication between devices in a vehicle. The method involves obtaining a vehicle identifier associated with the vehicle and a module identifier associated with a vehicle module. Then, the method determines a secure pin number for the vehicle module and a similar pin for a vehicle telematics unit. Once the secure pin number is determined at both devices then the devices can communicate via short range wireless communication in a secure manner using the secure pin number.

15 Claims, 2 Drawing Sheets

US 9,313,661 B2

METHOD OF ESTABLISHING COMMUNICATION BETWEEN DEVICES IN A VEHICLE

CROSS-REFERENCE TO RELATED APPLICATION

This application claims the benefit of U.S. Provisional Application No. 61/605,736, filed Mar. 1, 2012, the entire disclosure of which is hereby incorporated by reference.

TECHNICAL FIELD

The present invention relates generally to vehicle telematics systems and, more particularly, to systems and techniques for establishing secure short range wireless communication between devices in a vehicle.

BACKGROUND OF THE INVENTION

A vehicle user may acquire vehicle OEM products or add-on or aftermarket products and accessories including radios, phones, GPS, alarm systems, backup cameras, and/or other products. However, these products may have open and unsecure software, proprietary software, proprietary communication system and/or other hardware or software which may not enable these products to communicate with one or more vehicle modules and therefore, prevent the vehicle users from experiencing the full potential of these products.

SUMMARY OF THE INVENTION

According to one embodiment of the invention, there is provided a method for establishing secure short range wireless communication between devices in a vehicle, comprising the steps of: (a) carrying out the following steps (a1) through (a3) at a vehicle interface module, a vehicle telematics unit, or both: (a1) obtaining a vehicle identifier associated with the vehicle; (a2) obtaining a device identifier associated with the vehicle interface module, the vehicle telematics unit, or both; and (a3) determining a pin number using the vehicle identifier and the device identifier; and (b) communicating between the vehicle interface module and the vehicle telematics unit via short range wireless communication in a secure manner using the pin number.

According to another embodiment of the invention, there is provided a method for establishing secure short range wireless communication between devices in a vehicle, comprising the steps of: (a) carrying out the following steps (a1) through (a4) at a vehicle interface module located in a vehicle: (a1) receiving a vehicle identifier associated with the vehicle; (a2) determining a combined number using the vehicle identifier and a module identifier assigned to the vehicle interface module; (a3) determining a secure number by encrypting the combined number; and (a4) determining a pin number by shortening the secure number; (b) carrying out the following steps (b1) through (b4) at a vehicle telematics unit for the vehicle: (b1) receiving the module identifier; (b2) determining the combined number using the module identifier and the vehicle identifier; (b3) determining the secure number by encrypting the combined number; and (b4) determining the pin number by shortening the secure number; and (c) communicating between the vehicle interface module and the vehicle telematics unit via short range wireless communication in a secure manner using the pin number.

According to another embodiment of the invention, there is provided a system for establishing secure short range wireless communication in a vehicle, comprising a vehicle telematics unit (VTU) and a vehicle interface module (VIM), wherein the vehicle interface module includes a VIM processor and computer readable memory that contains instructions that are executed by the VIM processor to carry out the following steps: (a) receiving a vehicle identifier at a vehicle interface module; and (b) determining a pin number using the vehicle identifier and a module identifier of the vehicle interface module; wherein the vehicle telematics unit includes a VTU processor and computer readable memory that contains instructions that are executed by the VTU processor to carry out the following steps: (c) receiving the module identifier at the vehicle telematics unit; and (d) determining the pin number using the vehicle identifier and the module identifier; and wherein the vehicle telematics unit and vehicle interface module each contain wireless communication circuitry that operates to carry out short range wireless communication between the vehicle telematics unit and vehicle interface module using the pin number.

According to another embodiment of the invention, there is provided a vehicle telematics unit for use in short range wireless communication in a vehicle, comprising: a housing; first wireless communication circuitry that enables the telematics unit to communicate via a wireless cellular network; second wireless communication circuitry that enables the telematics unit to communicate with other devices within the vehicle via short range wireless communication; and an automated speech recognition system including a microphone, wherein the speech recognition system operates to receive a spoken identifier via the microphone and to convert the spoken identifier into a recognized identifier; wherein the first and second wireless communication circuitry and the automated speech recognition system are located within the housing; and wherein the telematics unit includes a processor and computer readable memory located within the housing, the memory being accessible by the processor and storing computer readable instructions, wherein the processor operates upon execution of the instructions to (a) receive the recognized identifier, (b) determine a pin number using the identifier, and (c) use the pin number for secure communication via the short range wireless communication.

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE ILLUSTRATED EMBODIMENT(S)

The system and methods described below establish secure short range wireless communication between devices in a vehicle. In the illustrated embodiment, this involves using of a vehicle telematics unit (VTU) and a vehicle interface module (VIM). A pin number is determined using a vehicle identifier and a device identifier that is associated with either the VTU or VIM, or both. This pin number can then be used by both the VTU and VIM to communicate via short range wireless communication in a secure manner. This arrangement is particularly advantageous when implementing an aftermarket or other telematics unit that is not wired directly to other electronic modules within the vehicle. Thus, for example, the telematics unit can be incorporated into a vehicle rearview mirror and provided only with electrical power and yet still communicate with the other modules in the vehicle via short range wireless communication with a vehicle interface module that has a wired connection to the vehicle network.

Communications System—

Figure 1:
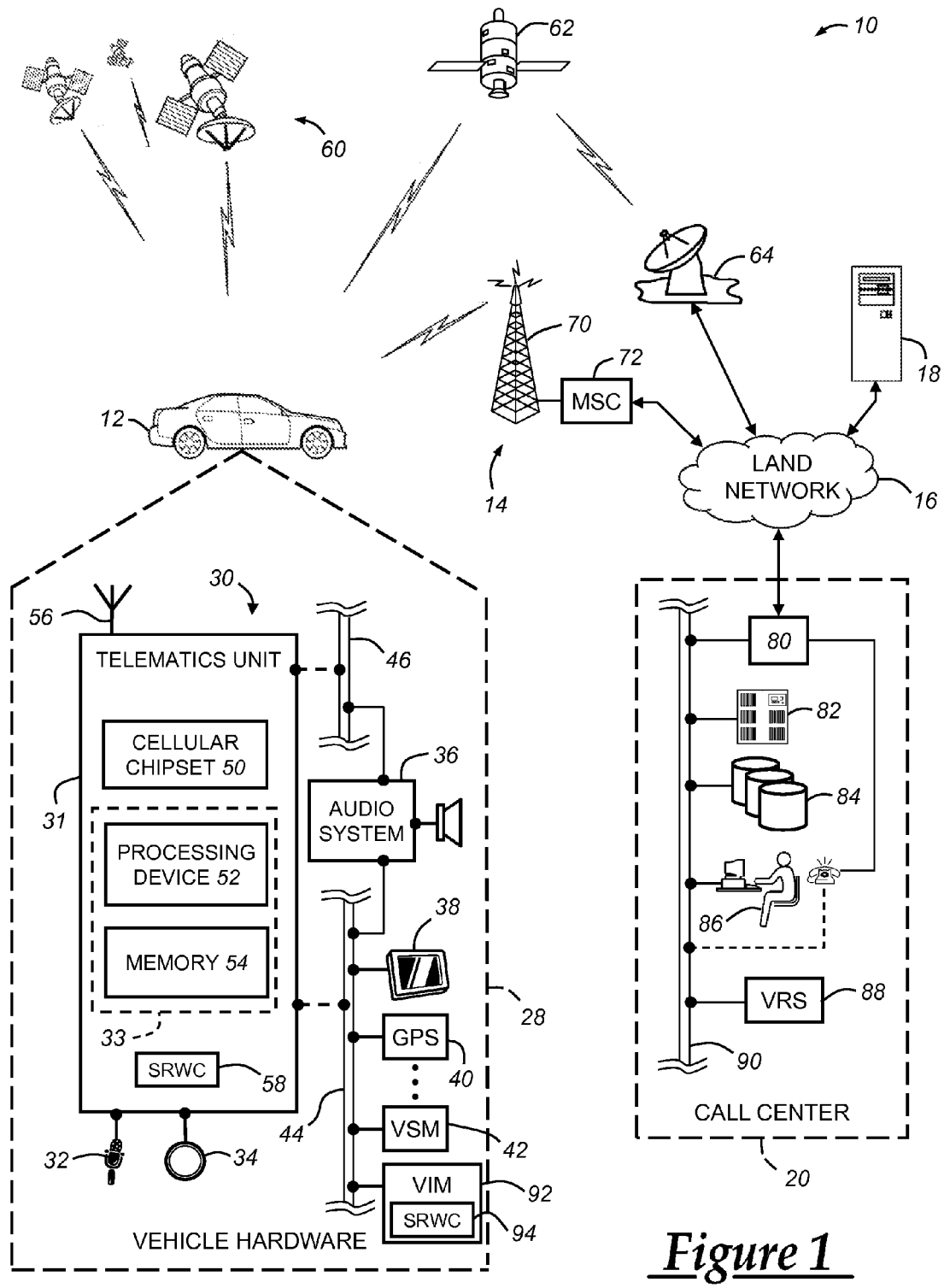
FIG. 1 is a block diagram depicting an exemplary embodiment of a communications system that is capable of utilizing the method disclosed herein.

With reference to FIG. 1, there is shown an exemplary operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a vehicle telematics unit (VTU) 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that enables wireless voice and/or data communication over wireless carrier system 14 and via wireless networking so that the vehicle can communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth™. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize short range wireless communication or vehicle bus 44 to exchange data and commands with the telematics unit.

In one embodiment, vehicle telematics unit 30 is used in short range wireless communication in vehicle 12 and includes a housing 31, first wireless communication circuitry 50 that enables the telematics unit to communicate via a wireless cellular network 14, second wireless communication circuitry 58 that enables the telematics unit to communicate with other devices within the vehicle via short range wireless communication (Bluetooth™, 802.11, or any other suitable means), and an automated speech recognition (ASR) system 33 including a microphone 32. The telematics unit 30 includes a processor 52 and computer readable memory 54 located within the housing, the memory 54 being accessible by the processor 52 and storing computer readable instructions, and the processor 52 operates upon execution of the instructions such the ones included in the method discussed below. The speech recognition system 33 operates to receive a spoken identifier via the microphone 32 and to convert the spoken identifier into a recognized identifier. The automated speech recognition system 33 may be implemented using the VTU processor 52 and memory 54, or may be a dedicated or other separate hardware circuit (separate processor, memory, etc.) located in housing 31 or elsewhere. The first and second wireless communication circuitry 50, 58 may also be located within the housing 31.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit such as ASR system 33 utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Another VSM is vehicle interface module (VIM) 92 which includes short range wireless communication circuitry 94 for communication with the communication circuitry 58 of the telematics unit (VTU) 30. These communication circuits utilize a common communication technology/protocol such as Bluetooth™, 802.11, or any other suitable technology. VIM 92 may be used as a gateway or interface through which some or all communication between the telematics unit 30 and the other VSMs is conducted via short range wireless communication circuits 58 and 94. VIM 92 may include any variety of electronic processing devices, memory devices, input/output (I/O) devices, and/or other known components, and may perform various control and/or communication related functions. In an exemplary embodiment, vehicle interface module 92 includes an electronic memory device that stores various parameters (e.g., serial number, configuration settings, etc.), look up tables or other data structures, algorithms (e.g., the algorithm described below), etc. The memory device may also store pertinent characteristics and background information pertaining to vehicle 12, such as vehicle identification number (VIN), etc. Vehicle interface module 92 may also include an electronic processing device (e.g., a microprocessor, a microcontroller, an application specific integrated circuit (ASIC), etc.). This VIM processor may be used to execute instructions for software, firmware, programs, algorithms, scripts, etc. that are stored in an associated memory device and may govern the processes and methods described herein. Vehicle interface module 92 may be electronically connected to other vehicle devices, modules and systems via suitable vehicle communications and can interact with them when required. For instance, vehicle interface module can be hardwired to a vehicle network including communication bus 44 within vehicle 12. These are, of course, only some of the possible arrangements, functions and capabilities of vehicle interface module 92, as other embodiments could also be used.

As a hardware device, VIM 92 may be implemented as a standalone device that may be removably connected to the vehicle electronics via, for example, an electrical connection such as a OBD-II port. Other implementations and means of connecting VIM 92 to the vehicle bus 44 or to other VSMs will be apparent to those skilled in the art.

Depending on the particular embodiment, vehicle interface module 92 may be a stand-alone vehicle electronic module, it may be incorporated or included within another vehicle electronic module, or it may be part of a larger network or system, to name a few possibilities. Vehicle interface module 92 is not limited to any one particular embodiment or arrangement.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Method—

Figure 2:
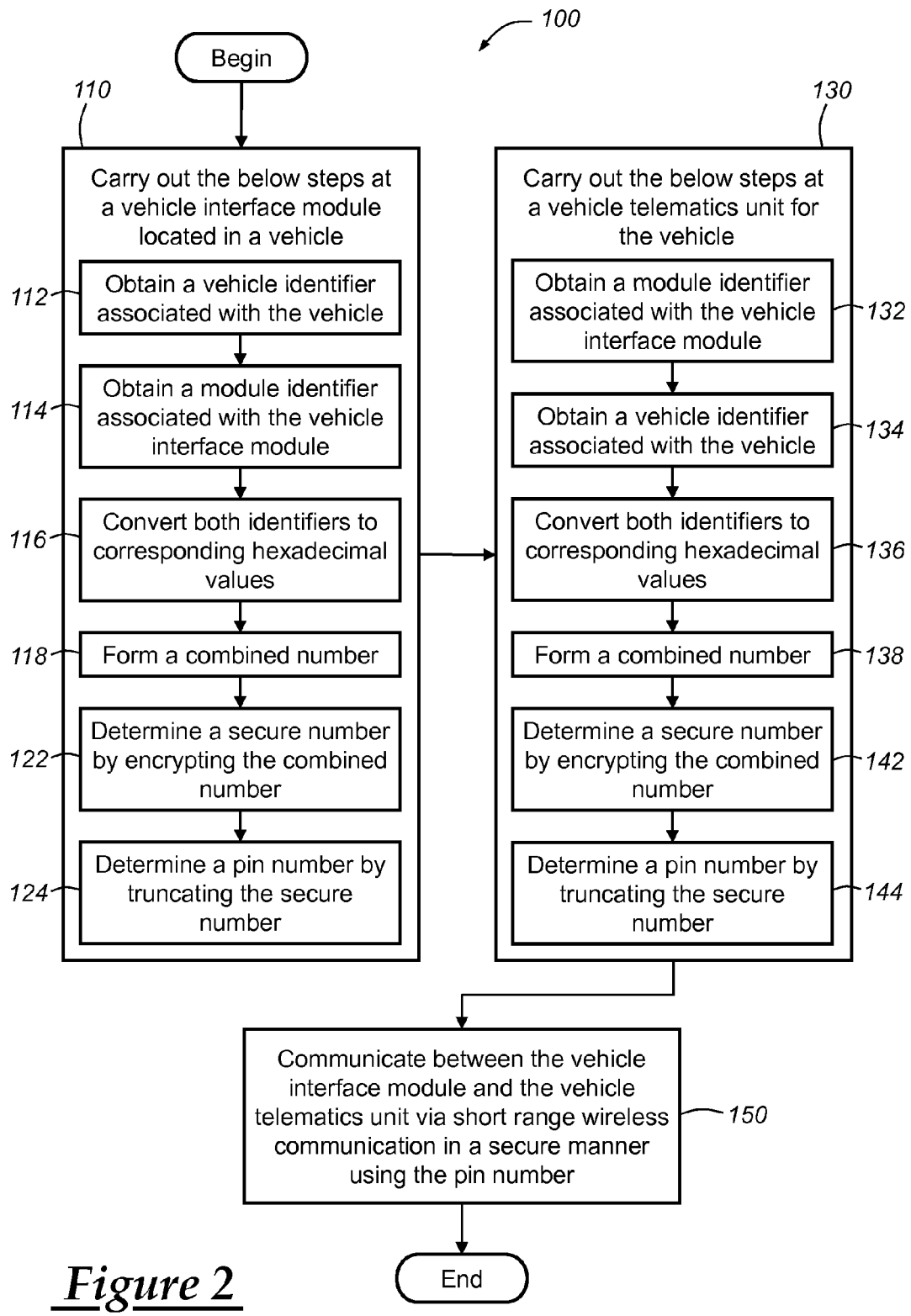
FIG. 2 is a flowchart of an exemplary embodiment of a method for establishing secure short range wireless communication between devices in a vehicle.

Turning now to FIG. 2, there is shown an exemplary embodiment of a method for establishing secure short range wireless communication between devices in a vehicle such as telematics unit 30 and vehicle interface module 92 discussed above. In this exemplary embodiment, the method determines a pin number for a vehicle interface module and a similar pin at the vehicle telematics unit. Once the pin number is determined at both devices then the devices can communicate via short range wireless communication in a secure manner using the pin number.

The method 100 starts at step 110 and begins by carrying steps 112-124 at a vehicle interface module located in a vehicle. At step 112, method 100 obtains a vehicle identifier associated with the vehicle. The vehicle identifier can be any unique identifier associated with the vehicle including vehicle identification number (VIN), serial number of vehicle engine, serial number of powertrain control module, a combination of numbers associated with the vehicle, a modified number associated with the vehicle (e.g., truncated or a portion of the VIN), and/or any other suitable unique identifier associated with the vehicle. In one embodiment, vehicle interface module 92 obtains a vehicle identifier of vehicle 12 such as its VIN via communication bus 44 from a VSM 42 including engine control module, powertrain control module, or another VSM module. In another embodiment, vehicle interface module 92 obtains the VIN of vehicle 12 via a diagnostic connection including an onboard diagnostic connection (e.g., OBD-I, OBD-II, JOBD, EOBD, EOBD2, etc.). In one exemplary embodiment, the vehicle identifier used is a 17 digit VIN such as a pretended 12345678901234567 VIN.

At step 114, method 100 obtains a device identifier that may be associated with the VTU 30, VIM 92, or both. In the illustrated embodiment, the device identifier is a module identifier associated with the vehicle interface module 92. The module identifier can be any identifier associated with the vehicle interface module including the serial number of the vehicle interface module, a serial number of the processor of the vehicle interface module, a combination of numbers associated with the vehicle interface module, a modified number associated with the vehicle interface module (e.g., truncated or a portion of a serial number of the interface module), and/or any other suitable unique identifier associated with the vehicle interface module. In one embodiment, vehicle interface module 92 obtains its own serial number from computer readable memory within the vehicle interface module 92. In another embodiment, vehicle interface module 92 obtains the module identifier via a hardwired connection to a vehicle network, for instance, vehicle interface module 92 obtains its serial number or another identifier from VSM 42 (e.g., engine control module, powertrain control module, etc.) via communication bus 44. In one exemplary embodiment, the module identifier used is the last four digits of the serial number of vehicle interface module 92; therefore, if the serial number is 123456 then the identifier is 3456.

At step 116, method 100 converts both identifiers to corresponding hexadecimal values. In one embodiment, vehicle interface module 92 converts its serial number or a portion of it and the VIN of vehicle or a portion of it to their corresponding hexadecimal values using a software application stored at vehicle interface module 92. Skilled artisans will recognize that other embodiments are also possible. For example, vehicle interface module 92 may store its serial number as a hexadecimal number in addition to or instead of a decimal number, an alphanumeric representation or any other representation and VSM 42 may also store the VIN of vehicle 12 as a hexadecimal number in addition to or instead of a decimal number, an alphanumeric representation or any other representation. Therefore, no conversion may be necessary. In addition to the hexadecimal representation which is base 16, other representations can be used including representations of base 2 (e.g., binary), base 32 (e.g., RFC 4648, crockford, etc.), base 64 (e.g., RFC 1421, RFC 2045, etc.), and/or any other suitable representation or encoding. Skilled artisans will recognize that steps 112, 114, and 116 may be performed in different order. For instance, step 114 can be performed before step 112 since the vehicle identifier and the module identifier may be obtained in any order. Also, step 116 can be performed after step 112 and then after step 114 since one identifier can be obtained and later the identifier is converted afterward another identifier is obtained and later the second identifier is converted or both identifiers can be obtained and later both converted. In one embodiment and continuing with the previous exemplary embodiments where the vehicle identifier is 12345678901234567 and the module identifier is 3456 then the corresponding hexadecimal representations are 31323334353637383930313233343536 37 and 33343536. In this case, each character of the vehicle identifier and the module identifier is converted to its hexadecimal equivalent such as 31 hexadecimal for character 1, 32 hexadecimal for character 2, etc.

Next, at step 118, the hexadecimal values of the vehicle identifier and the module identifier are combined to form a combined number. In one embodiment, vehicle interface module 92 concatenates the hexadecimal value of its serial number or a portion of it ($N_i$) and the VIN of vehicle 12 or a portion of it ($N_v$) to form a combined number by joining both numbers end to end (e.g., $N_iN_v$, $N_vN_i$, etc.). Other techniques are also possible including adding both numbers (e.g, $N_i+N_v$), subtracting one number from the other (e.g., $N_i-N_v$, $N_v-N_i$, etc.), diving a number by the other (e.g., $N_v/N_i$, $N_i/N_v$, etc.), and/or other suitable technique. In addition, the combined number can be modified, truncated, or manipulated to obtain a refined number including adjusting its size, number of digits, etc. Continuing with the previous exemplary embodiment where the hexadecimal values for the vehicle identifier and module identifier are 31323334353637383930313233334353637 and 33343536, are now combined to form 3132333435363738393031323334353637 33343536. In this case, 33343536 is concatenated to the end of 3132333435363738393031323334353637.

Next, at step 122, method 100 determines a secure number by encrypting the combined number. Several encrypting techniques may be used including cryptographic hash function, secure hash algorithm (e.g., SHA-0, SHA-1, SHA-2 (e.g., SHA-224/256/384/512), SHA-3, etc.), message digest algorithm (e.g., MD2, MD4, MD5, MD6, etc.), RACE integrity primitives evaluation message digest (e.g., RIPEMD-160, RIPEMD-320, RIPEMD-128, RIPEMD-256, etc), and/or others. In one embodiment, vehicle interface module 92 encrypts the combined number using a hash function to provide a secure number. Continuing with the previous exemplary embodiment, in case vehicle interface module 92 performs a SHA-1 hash function on the combined number 3132333435363738393031323334353637 33343536 then the secure number is 1D74CD26EA6264A300A7341F9EBE0ED13C18E472. Other embodiments are also possible, for example, if vehicle interface module 92 performs an MD5 function on the combined number then the secure number is 0F3A9B8E4165186ADDBFE5035DA237 CE. In another example, if vehicle interface module 92 performs a SHA-2 such as SHA-224 function on the combined number then the secure number is 9F5EAE91732E6D891F668CD3630FD198B66682E4BFA31F5AD20C5FE7.

At step 124, method 100 determines a pin number by truncating the secure number. This is an optional step since method 100, in one embodiment, may use the secure number as a pin number. However, method 100 may truncate, modify, or adjust the secure number to determine a pin number. In a preferred embodiment, vehicle interface module 92 truncates the secure number to determine a shorter and user-friendly pin number. Continuing with the previous exemplary embodiment, vehicle interface module 92 truncates the secure number 1D74CD26EA6264A300A7341F9EBE0ED13C 18E472 determined via a SHA-1 function to a, for example, a 16 character pin number 1D74CD26EA6264A3. Skilled artisans will recognize that other embodiments are also possible.

At step 130, method 100 carries steps 132-144 at a vehicle telematics unit for the vehicle. Some steps are similar to steps 112-124; therefore, only the differences are discussed herein and a reiteration of similar steps procedure is omitted. At step 132, method 100 obtains a module identifier associated with the vehicle interface module. This identifier is similar to the identifier obtained in step 114. In one embodiment, vehicle telematics unit 30 receives the module identifier from user input to the telematics unit 30. For instance, telematics unit 30 may receive the module identifier as speech via microphone 32 in the vehicle telematics unit 30. Using the same exemplary identifier provided in step 114, a user of vehicle 12 may provide 3456 as the module identifier. The user may provide the identifier in order to establish communication between telematics unit 30 and interface module 92 as discussed herein.

Next, at step 134, method 100 obtains a vehicle identifier associated with the vehicle interface module. This identifier is similar to the identifier obtained in step 112. In one embodiment, processing device 52 obtains the vehicle identifier from computer readable memory 54 within the vehicle telematics unit 30. The vehicle identifier can be stored in memory 54 using one of a variety methods, for instance, the VIN of vehicle 12 may be stored in memory during installation of vehicle telematics unit 30 in vehicle 12. However, the vehicle identifier can be stored in a different module including VSM 42 and/or others as previously described in step 112.

Next, method 100 converts both module identifier and vehicle identifiers to corresponding hexadecimal values (step 136). Then, method 100 forms a combined number from the hexadecimal values (step 138). Later, method 100 determines a secure number by encrypting the secure number (step 142). Then, method 100 determines a pin number by truncating the secure number (step 144) where the pin number is similar the pin number determined in step 124. Steps 136-144 are similar to corresponding steps 116-124; therefore, a lengthy reiteration of these steps detail is omitted.

At step 150, method 100 provides the ability to communicate between the vehicle interface module 92 and the vehicle telematics unit 30 via short range wireless communication in a secure manner using the pin number. Since, as discussed herein, vehicle interface module 92 can be hardwired to a vehicle network such as communication bus 44 within the vehicle 12 and the vehicle telematics unit 30 can be configured for wireless communication with a call center 20 via a wireless communication system 14 then an exchange of data between the vehicle network and a call center 20 via the vehicle telematics unit 30, the vehicle interface module 92, the wireless communication system 14, and the short range wireless communication is possible.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method for establishing secure short range wireless communication between devices in a vehicle, comprising the steps of:
    (a) carrying out the following steps (a1) through (a3) at a vehicle interface module, a vehicle telematics unit, or both:
        (a1) obtaining a vehicle identifier associated with the vehicle;
        (a2) obtaining a device identifier associated with the vehicle interface module, the vehicle telematics unit, or both; and
        (a3) determining a pin number using the vehicle identifier and the device identifier; and
    (b) communicating between the vehicle interface module and the vehicle telematics unit via short range wireless communication in a secure manner using the pin number.

2. The method of claim 1, wherein the vehicle identifier is a vehicle identification number (VIN).

3. The method of claim 1, wherein the device identifier comprises at least a portion of a serial number assigned to the vehicle interface module.

4. The method of claim 1, wherein step (a3) further comprises the steps of converting the vehicle identifier to a hexadecimal value, converting the device identifier to a hexadecimal value, forming a combined number from the hexadecimal values, determining a secure number by encrypting the combined number, and determining the pin number by truncating the secure number.

5. The method of claim 4, wherein the step of determining the secure number further comprises encrypting the combined number using a hash function.

6. The method of claim 1, wherein steps (a1) through (a3) are carried out at both the vehicle interface module and the vehicle telematics unit.

7. The method of claim 6, wherein, when carried out at the vehicle interface module, step (a1) comprises obtaining the vehicle identifier via a hardwired connection to a vehicle network and step (a2) comprises obtaining the device identifier from computer readable memory within the vehicle interface module.

8. The method of claim 6, wherein, when carried out at the vehicle telematics unit, step (a1) comprises obtaining the vehicle identifier from computer readable memory within the vehicle telematics unit and step (a2) comprises receiving the device identifier from user input to the telematics unit.

9. The method of claim 8, wherein, when carried out at the vehicle telematics unit, step (a2) further comprises receiving the device identifier as speech via a microphone in the vehicle telematics unit.

10. The method of claim 1, wherein the vehicle interface module is hardwired to a vehicle network within the vehicle and the vehicle telematics unit is configured for wireless communication with a call center via a wireless communication system, and wherein step (b) further comprises the step of exchanging data between the vehicle network and a call center via the vehicle telematics unit, the vehicle interface module, the wireless communication system, and the short range wireless communication.

11. A method for establishing secure short range wireless communication between devices in a vehicle, comprising the steps of:
- (a) carrying out the following steps (a1) through (a4) at a vehicle interface module located in a vehicle:
  - (a1) receiving a vehicle identifier associated with the vehicle;
  - (a2) determining a combined number using the vehicle identifier and a module identifier assigned to the vehicle interface module;
  - (a3) determining a secure number by encrypting the combined number; and
  - (a4) determining a pin number by shortening the secure number;
- (b) carrying out the following steps (b1) through (b4) at a vehicle telematics unit for the vehicle:
  - (b1) receiving the module identifier;
  - (b2) determining the combined number using the module identifier and the vehicle identifier;
  - (b3) determining the secure number by encrypting the combined number; and
  - (b4) determining the pin number by shortening the secure number; and
- (c) communicating between the vehicle interface module and the vehicle telematics unit via short range wireless communication in a secure manner using the pin number.

12. The method of claim 11, wherein steps (a2) and (b2) further comprise concatenating a hexadecimal representation of the vehicle identifier and a hexadecimal representation of the module identifier of the vehicle interface module.

13. The method of claim 11, wherein steps (a3) and (b3) further comprise encrypting the combined number using a hash function.

14. The method of claim 11, wherein step (b1) further comprises receiving the module identifier as speech via a microphone in the vehicle telematics unit.

15. A system for establishing secure short range wireless communication in a vehicle, comprising a vehicle telematics unit (VTU) and a vehicle interface module (VIM), wherein the vehicle interface module includes a VIM processor and computer readable memory that contains instructions that are executed by the VIM processor to carry out the following steps:
- (a) receiving a vehicle identifier at a vehicle interface module; and
- (b) determining a pin number using the vehicle identifier and a module identifier of the vehicle interface module;

wherein the vehicle telematics unit includes a VTU processor and computer readable memory that contains instructions that are executed by the VTU processor to carry out the following steps:
- (c) receiving the module identifier at the vehicle telematics unit; and
- (d) determining the pin number using the vehicle identifier and the module identifier; and wherein the vehicle telematics unit and vehicle interface module each contain wireless communication circuitry that operates to carry out short range wireless communication between the vehicle telematics unit and vehicle interface module using the pin number.

* * * * *